(12) United States Patent
Iguchi

(10) Patent No.: US 10,618,336 B2
(45) Date of Patent: Apr. 14, 2020

(54) DECOLORING APPARATUS AND METHOD

(71) Applicants: KABUSHIKI KAISHA TOSHIBA, Tokyo (JP); TOSHIBA TEC KABUSHIKI KAISHA, Tokyo (JP)

(72) Inventor: Ken Iguchi, Numazu Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/126,003

(22) Filed: Sep. 10, 2018

(65) Prior Publication Data

US 2019/0001729 A1    Jan. 3, 2019

Related U.S. Application Data

(63) Continuation of application No. 15/253,422, filed on Aug. 31, 2016, now Pat. No. 10,118,428, which is a
(Continued)

(51) Int. Cl.
| | |
|---|---|
| *B41M 7/00* | (2006.01) |
| *B41J 29/26* | (2006.01) |
| *B41J 29/36* | (2006.01) |
| *G03G 15/00* | (2006.01) |
| *G03G 21/00* | (2006.01) |

(Continued)

(52) U.S. Cl.
CPC .............. *B41M 7/009* (2013.01); *B41J 2/32* (2013.01); *B41J 2/4753* (2013.01); *B41J 29/26* (2013.01); *B41J 29/36* (2013.01); *B41M 7/0009* (2013.01); *G03G 15/2064* (2013.01); *G03G 15/602* (2013.01); *G03G 15/6529* (2013.01); *G03G 15/6585* (2013.01); *G03G 21/00* (2013.01); *H04N 1/00* (2013.01); *H04N 1/00822* (2013.01); *B41J 2002/4756* (2013.01); *B41J 2202/37* (2013.01); *G03G 15/6582* (2013.01); *H04N 2201/212* (2013.01); *H04N 2201/33328* (2013.01)

(58) Field of Classification Search
CPC ...... B41M 7/009; B41M 7/0009; B41J 29/26; B41J 2202/37
See application file for complete search history.

(56) References Cited

U.S. PATENT DOCUMENTS

| | | |
|---|---|---|
| 8,538,317 B2 | 9/2013 | Iguchi |
| 8,608,166 B2 | 12/2013 | Iguchi et al. |

(Continued)

*Primary Examiner* — Alessandro V Amari
*Assistant Examiner* — Kendrick X Liu
(74) *Attorney, Agent, or Firm* — Kim & Stewart LLP

(57) ABSTRACT

A decoloring apparatus includes a sheet conveying unit, a scanner, a decoloring unit, and a controller. The decoloring unit decolors the image on the sheet conveyed through the sheet conveying unit. The decoloring unit is positioned downstream of the scanner in a sheet conveying direction. A distance along the sheet conveying direction between the scanner and the decoloring unit is shorter than a length of a first predetermined sheet size and longer than a length of a second predetermined sheet size. A controller determines whether the sheet conveyed by the sheet conveying unit is the first predetermined sheet size or the second predetermined sheet size. The controller performs a mode limiting process if the sheet size is determined to be the first predetermined sheet size.

5 Claims, 8 Drawing Sheets

Related U.S. Application Data continuation of application No. 14/584,488, filed on Dec. 29, 2014, now Pat. No. 9,434,193.

(51) Int. Cl.
*H04N 1/00* (2006.01)
*B41J 2/32* (2006.01)
*B41J 2/475* (2006.01)
*G03G 15/20* (2006.01)

(56) References Cited

U.S. PATENT DOCUMENTS

| | | |
|---|---|---|
| 8,717,618 B2 | 5/2014 | Iguchi et al. |
| 8,743,164 B2 | 6/2014 | Iguchi et al. |
| 8,821,096 B2 | 9/2014 | Iguchi et al. |
| 8,848,239 B2 | 9/2014 | Iguchi et al. |
| 9,434,193 B2 | 9/2016 | Iguchi |
| 2002/0158216 A1 | 10/2002 | Neriishi et al. |
| 2010/0128327 A1 | 5/2010 | Maeshima et al. |
| 2010/0194839 A1 | 8/2010 | Taguchi et al. |
| 2011/0065056 A1 | 3/2011 | Iguchi et al. |
| 2011/0199625 A1 | 8/2011 | Sugimoto et al. |
| 2011/0222131 A1 | 9/2011 | Yahata et al. |
| 2011/0292419 A1 | 12/2011 | Shibuya |
| 2012/0025454 A1* | 2/2012 | Iguchi .................... B65H 29/60 271/225 |
| 2012/0306985 A1* | 12/2012 | Iguchi ........................ B41J 2/32 347/179 |
| 2013/0242023 A1 | 9/2013 | Iguchi et al. |
| 2013/0258026 A1* | 10/2013 | Iguchi .................. B41M 7/0009 347/179 |
| 2013/0267412 A1 | 10/2013 | Kawaguchi |
| 2014/0183368 A1 | 7/2014 | Ishikawa et al. |

\* cited by examiner

DECOLORING APPARATUS AND METHOD

CROSS-REFERENCE TO RELATED APPLICATIONS

This application is a continuation of U.S. patent application Ser. No. 15/253,422, filed on Aug. 31, 2016, which is a continuation of U.S. patent application Ser. No. 14/584,488, filed on Dec. 29, 2014, now U.S. Pat. No. 9,434,193, issued on Sep. 6, 2016, the entire contents of each of which are incorporated herein by reference.

FIELD

Embodiments described herein relate to a decoloring apparatus provided with a scanner for scanning an image of a fed sheet.

BACKGROUND

Conventionally, decoloring apparatus decolors an image that has been printed on a sheet with a decolorable color material, in order to reuse the sheet. In such a decoloring apparatus, the sheet on which an image is printed with the decolorable color material is conveyed by a sheet conveying unit to a decoloring unit to decolor the image. The sheet conveying unit includes a scanner for scanning the image on the sheet conveyed to the decoloring unit.

The quality of the image scanned by the scanner is lowered if the conveyance speed of the sheet is unstable. If the distance between the scanner and the decoloring unit is shorter than the length of the sheet in the conveyance direction, different portions of the sheet pass through the scanner and the decoloring unit at the same time. If the sheet is affected by the sheet feeding resistance when entering the decoloring unit or when passing through the decoloring unit, the conveyance speed of the sheet passing through the scanner becomes unstable. The conveyance speed of the sheet should be maintained with high precision in order to carry out high resolution image scanning.

However, it is not practical to maintain the conveyance speed of the sheet with high precision even when the front end of the sheet enters or passes through the decoloring unit.

DETAILED DESCRIPTION

In accordance with one embodiment, a decoloring apparatus comprises a sheet conveying unit, a scanner, a decoloring unit positioned downstream of the scanner, a user interface, and a controller. The user interface includes a resolution setting section configured to receive input for setting the resolution of the image to be scanned by the scanner, and a processing mode setting section configured to receive input for setting whether to execute scanning processing by the scanner and for setting whether to execute decoloring processing by the decoloring unit. The controller is configured to control contents of the user interface and to perform a mode limiting processing so that when one of the scanning processing and decoloring processing is set to be executed, the other of the scanning processing and decoloring processing cannot be set to be executed.

Hereinafter, the decoloring apparatus according to the present embodiment is described in detail with reference to the accompanying drawings.

Figure 1:
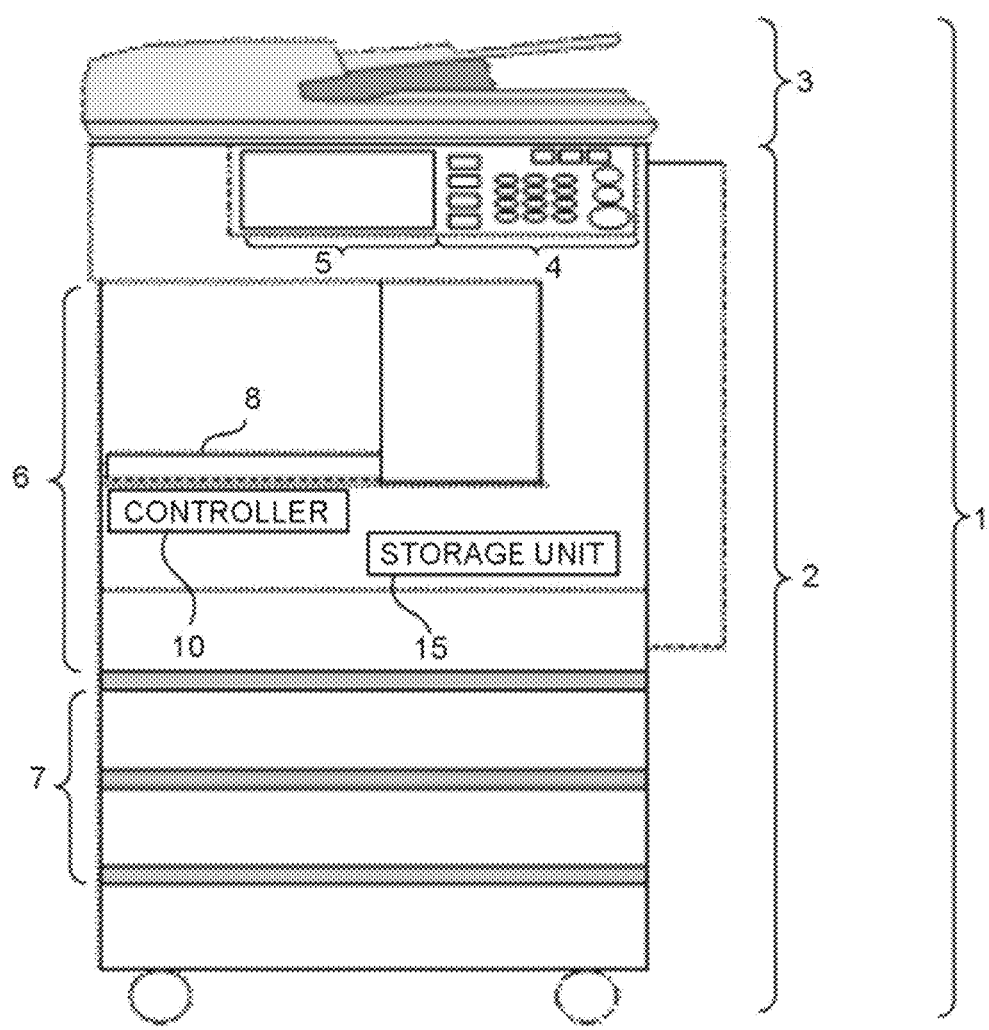
FIG. 1 is a schematic front view of a multi function peripheral (MFP) provided with a decoloring apparatus according to an embodiment.
Figure 2:
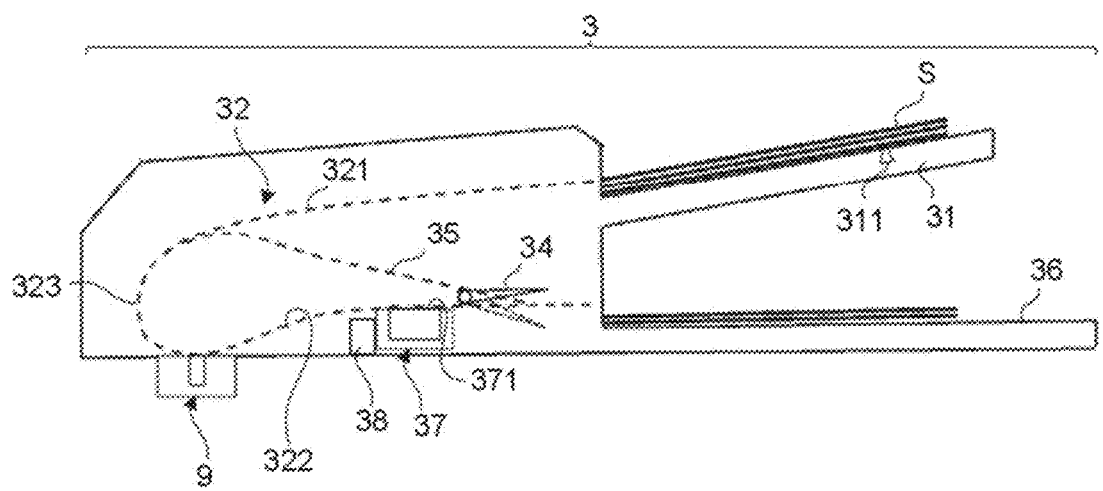
FIG. 2 is schematic view of the decoloring apparatus shown in FIG. 1.
Figure 3:
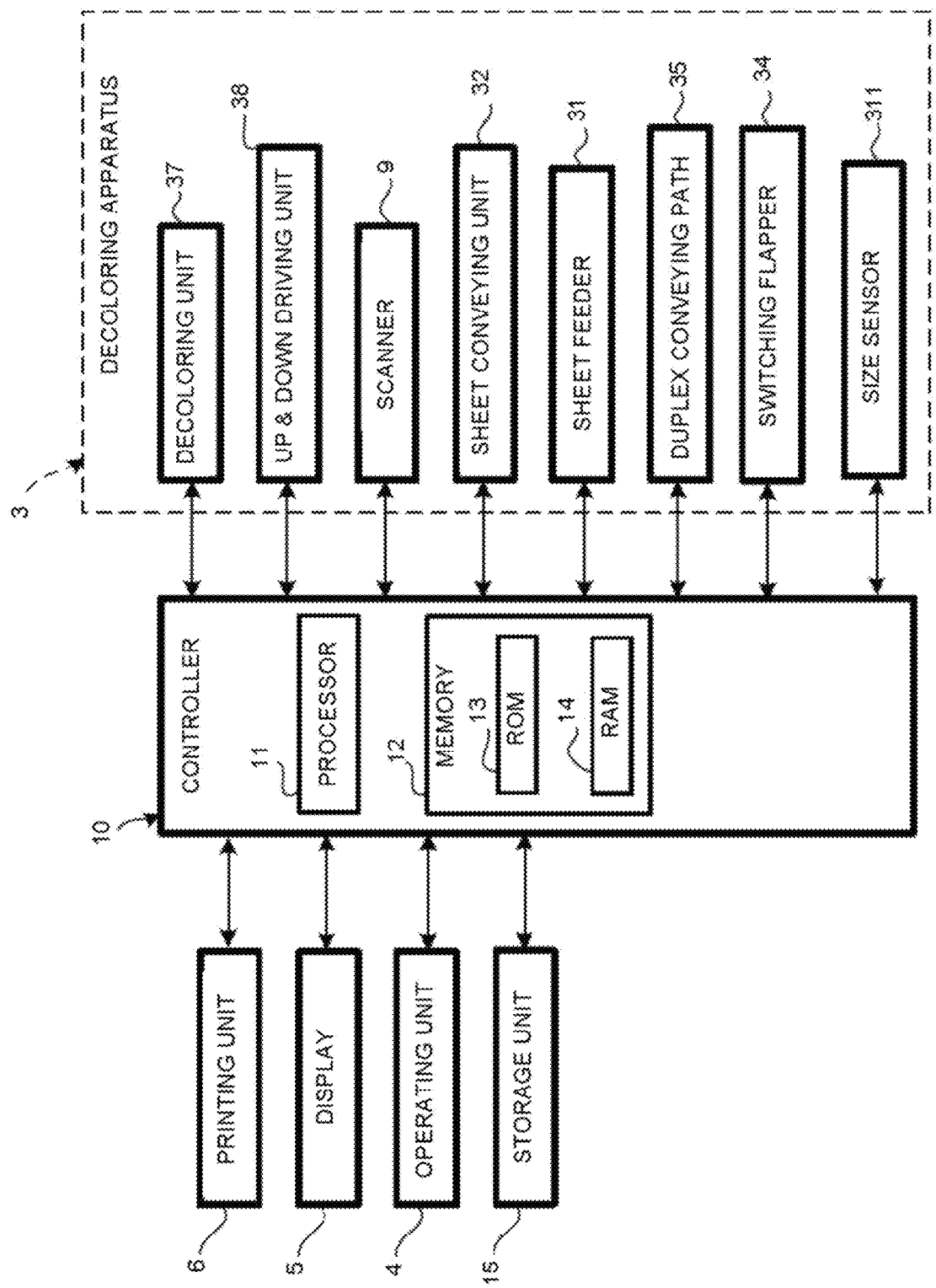
FIG. 3 is a block diagram illustrating components of the MFP.

FIG. 1 is a schematic front view of a multi function peripheral (MFP) 1 provided with a decoloring apparatus 3 according to the embodiment. FIG. 2 is a schematic view of the decoloring apparatus 3 shown in FIG. 1. FIG. 3 is a block diagram illustrating components of the MFP 1.

The decoloring apparatus 3 is configured to decolor an image formed on a recording medium, such as a sheet, with a decolorable color material. The decolorable color material includes a color generating compound, a color developing agent and a decolorant. For the color generating compound, for example, a leuco dye may be used. For the color developing agent, for example, a phenol group may be used. For the decolorant, a substance which combines with the color generating compound when heated and does not have affinity with the color developing agent may be used. The decolorable color material generates a color through the interaction of the color generating compound and the color developing agent. The decolorable color material is decolored when the interaction of the color generating compound and the color developing agent is eliminated by heating above a decoloring temperature.

The generated color includes not only chromatic color but also achromatic color such as white color, black color and the like. The "decoloring" in the present embodiment refers to making the image, which is formed in a color different from the background color of the sheet, invisible. Herein, "making the image invisible" further can include changing the image formed in a color different from the background color of the sheet to a color which is the same as or approximate to the background color of the sheet. Additionally, "making the image invisible" can include making the image formed with the decolorable color material transparent.

In FIG. 1, the MFP (Multi Function Peripheral) 1 includes the decoloring apparatus 3 positioned above a main body 2. An operating unit 4, including a start switch and the like, and a display 5 are arranged at the upper portion of the main body 2. The main body 2 includes, for example, a printing unit 6, a sheet feed cassette unit 7, a sheet conveying path for conveying the sheet stacked in the sheet feed cassette unit 7 from a transfer position to a fixing device, and a sheet discharge unit 8 to which the sheet subjected to fixing processing is discharged.

The printing unit 6 may be provided with an electrophotographic type image forming processing unit (not shown) which includes a photoconductive drum, a transfer unit (not shown) which transfers a toner image formed on the photoconductive drum to the sheet at a transfer position, and a fixing device (not shown) which heats and presses the toner image transferred to the sheet to fix the toner image on the sheet.

The decoloring apparatus 3 is equipped with a scanner 9 and is also used as an automatic document feeder (ADF). The decoloring apparatus 3 includes a sheet feeder 31 for placing a sheet S on which an image is printed with the decolorable color material, a sheet conveying unit 32, a switching flapper 34, a sheet duplex conveying path 35, a sheet discharge unit 36, a decoloring unit 37 and an up and down driving unit 38 for moving the decoloring unit 37 upwards or downwards. The sheet conveying unit 32 includes an upper conveying path 321, a lower conveying path 322, and a reversal conveying path 323 which connects the upper conveying path 321 and the lower conveying path 322. The scanner 9 is arranged at the upstream side of the lower conveying path 322 in the conveyance direction and the decoloring unit 37 is arranged at the downstream side of the lower conveying path 322 in the conveyance direction. The decoloring unit 37 has a heating surface 371 facing the lower conveying path 322. The heating surface 371 includes, for example, a planar ceramic heater, and a pressing roller may be positioned opposite to the ceramic heater. In addition, the scanner 9 of the decoloring apparatus 3 may be used as the scanner of the MFP 1.

The sheet discharge unit 36 is connected with the downstream end of the lower conveying path 322 in the conveyance direction. The sheet duplex conveying path 35 is arranged between the lower conveying path 322 and the upper conveying path 321. The sheet duplex conveying path 35 branches off from the lower conveying path 322 at the downstream side of the decoloring unit 37 in the conveyance direction. The switching flapper 34 is arranged at the branch point.

When the switching position of the switching flapper 34 is in the position shown by the solid line, the sheet S conveyed through the lower conveying path 322 passes under the switching flapper 34. In a case in which the switching position of the switching flapper 34 is the position shown by the dashed line, the sheet stacked on the sheet discharge unit 36 is conveyed through the sheet duplex conveying path 35 towards the junction of the sheet duplex conveying path 35 and the upper conveying path 321. The sheet S is then conveyed from the upper conveying path 321 towards the lower conveying path 322 with the second surface facing the scanning surface of the scanner 9.

When the decoloring unit 37 is pushed up by the up and down driving unit 38, the heating surface 371 of the decoloring unit 37 is brought into press contact with the lower conveying path 322. When the decoloring unit 37 is pushed down by the up and down driving unit 38, the heating surface 371 of the decoloring unit 37 is separated from the lower conveying path 322.

Thus, when the decoloring unit 37 is pushed up, the conveyed sheet S enters a nip formed between the heating surface 371 and the lower conveying path 322. At this time, the sheet encounters resistance when entering the nip. Therefore, the sheet conveyance speed when the sheet enters the nip is reduced from the set sheet conveyance speed before the sheet enters the nip. Further, when the sheet is conveyed through the nip, the sheet conveyance speed is reduced with respect to the set sheet conveyance speed.

Conversely, when the decoloring unit 37 is lowered, the conveyed sheet S enters a space, instead of a nip, between the heating surface 371 and the lower conveying path 322. Thus, the sheet S is passed through the decoloring unit 37 at the set speed without changing the conveyance speed of the sheet S.

In the sheet conveying unit 32, the distance between the scanner 9 and the decoloring unit 37 is set to L (hereinafter referred to as specific distance L).

A size sensor 311 for detecting the size of the stacked sheet S is arranged in the sheet feeder 31. The size sensor 311 detects the length of the sheet S in the conveyance direction, and a determination whether the sheet S is longer than the specific distance L is made. For example, in the present embodiment, based on the detection from the size sensor 311, the sheet S on the sheet feeder 31 is determined to have a length that is larger than A4 size.

In the present embodiment, after the rear end of an A4 sized (or smaller) sheet S passes through the scanner 9, the front end of the sheet S has not arrived at the decoloring unit 37 yet. Thus, the quality of the scanned image is not affected even if the sheet conveyance speed is changed with respect to the set sheet conveyance speed when the A4 sized sheet S enters the nip between the heating surface 371 of the decoloring unit 37 and the lower conveying path 322. In other words, the state is avoided in which the sheet S is conveyed through the decoloring unit 37 while passing through the scanner 9. Thus, when the sheet S passes through the scanner 9, the sheet conveyance speed is not changed but maintained at the set sheet conveyance speed. However, if the sheet S is larger than an A4 sized sheet, the sheet S is still in the scanner 9 when the front end thereof has arrived at the decoloring unit 37. Thus, the sheet conveyance speed is changed with respect to the set sheet conveyance speed when the sheet S passes through the scanner 9.

When the resolution of the scanner 9 is high, if the sheet conveyance speed is changed with respect to the set sheet conveyance speed when the sheet S passes through the scanner 9, the quality of the scanned image is affected. When the resolution of the scanner 9 is low, the quality of the scanned image is barely affected even if the sheet conveyance speed is slightly changed with respect to the set sheet conveyance speed.

Further, when the resolution of the scanner 9 is high, the sheet conveyance speed of the sheet S can be maintained at the set sheet conveyance speed if the decoloring unit 37 is lowered downwards. Thus, if the decoloring unit 37 is lowered, the scanner 9 can perform a high quality scan of the image printed on the first surface of the sheet S with high resolution.

After passing through the lowered-down decoloring unit 37, the sheet S is stopped and made to wait in a state in which the sheet S can be conveyed reversely. Then the decoloring unit 37 is raised up to form the nip to carry out decoloring processing. In this state, the sheet S can be reverse-conveyed on the lower conveying path 322 and passed through the decoloring unit 37 so that the processing for decoloring the image printed on the first surface of the sheet S is executed. Alternatively, the switching flapper 34 can be switched to the position indicated by the dashed line to guide the sheet S to the sheet duplex conveying path 35 and further to the upper conveying path 321.

The sheet S conveyed to the upper conveying path 321 is further conveyed to the lower conveying path 322 with the second surface thereof facing the scanner 9 as the scanning side. Then, the image on the second surface is scanned by the scanner 9. In this manner, the scanning of the images on the first surface and the second surface of the sheet S is completed. During the image scanning process, the decoloring unit 37 is moved downwards. After the image scanning process is completed, the decoloring unit 37 is moved upwards to form the nip. Then the sheet is conveyed and brought into press contact with the heating surface 371 so that the second surface of the sheet is decolored. Thus, when the switching flapper 34 is switched and the sheet S is conveyed through the duplex conveying path 32 twice, the image on the first surface and the image on the second surface can both be decolored. When the image is printed only on the first surface of the sheet S, if the sheet S is conveyed on the sheet duplex conveying path 35 twice, the first surface of the conveyed sheet S is brought into press contact with the heating surface 371 while the sheet S passes through the decoloring unit 37. In this way, the image on the first surface of the sheet S is decolored.

In the present embodiment, as shown in FIG. 4, FIG. 5, FIG. 6 and FIG. 8, various settings relating to the decoloring processing are input through a scanning setting screen 50 displayed on the touch panel type display 5. The information input through the scanning setting screen 50 is acquired by the controller 10. Further, the image scanned by the scanner 9 is stored in the storage unit 15.

As shown in FIG. 3, the controller 10 is connected to the printing unit 6, the display 5 and the operating unit 4. Further, the controller 10 is also connected to the decoloring unit 37, the up and down driving unit 38, the scanner 9, the sheet conveying unit 32, the sheet feeder 31, the sheet duplex conveying path 35, the switching flapper 34 and the size sensor 311 of the decoloring apparatus 3.

A color mode setting unit 51, a resolution setting unit 52, a scanning side setting unit 53, a processing mode setting unit 54, a sheet size setting unit 55, an OK button 56 and a cancel button 57 are displayed in the scanning setting screen 50 on the display 5.

The color mode setting unit 51 includes a monochrome setting button 511, a gray scale button unit 512 and a color setting button 513. If one of these setting buttons 511-513 is touched and selected, the selected setting button is displayed in white characters.

The resolution setting unit 52 includes a 100 dpi setting button 521, a 200 dpi setting button 522, a 300 dpi setting button 523, a 400 dpi setting button 524 and a 600 dpi setting button 525. If one of these setting buttons 521-525 is touched and selected, the selected setting button is displayed in white characters.

The scanning side setting unit 53 includes a setting button 531 for outputting a single-sided image from an input of a single-sided image, a setting button 532 for outputting a single-sided image from an input of a double-sided image, a setting button 533 for outputting a double-sided image from an input of a single-sided image and a setting button 534 for outputting a double-sided image from an input of a double-sided image. If one of these setting buttons 531-534 is touched and selected, the selected setting button is displayed in white characters.

The processing mode setting unit 54 includes a scanning processing setting button 541 and a decoloring processing setting button 542. If either of these setting buttons 541 and 542 is touched and selected, the selected setting button is displayed in white characters. In the present embodiment, a case of executing either of the scanning processing and the decoloring processing is referred to as a first processing, and a case of executing both of the scanning processing and the decoloring processing is referred to as a second processing.

The sheet size setting unit 55 includes an A5 size setting button 551, an A4 size setting button 552, an A3 size setting button 553 and a Legal size setting button 554. If one of these setting buttons 551-554 is touched and selected, the selected setting button is displayed in white characters. In addition, if the size of the sheet stacked on the sheet feeder 31 is larger than the specific distance L based on the detection information of the size sensor 311, the size setting button indicating a size larger than the specific distance L is displayed in white characters.

If a user determines that there is no error in the items set in the setting screen 50, the OK button 56 is pressed; otherwise, the cancel button 57 is pressed. If the OK button 56 is pressed, the information set in the setting screen 50 is sent to the controller 10.

The controller 10 includes a memory 12 and a processor 11 which may be, for example, a CPU (Central Processing Unit) or a MPU (Micro Processing Unit). The memory 12 (which is, for example, a semiconductor memory) includes a ROM (Read Only Memory) 13 for storing various control programs and a RAM (Random Access Memory) 14 for providing a temporary work area for the processor 11. For example, the ROM 13 may store programs for limiting resolution selection and for limiting simultaneous processing of scanning and decoloring processing, the use of duplex conveying path 35, and the like according to whether or not the size of the sheet stacked on the sheet feeder 31 is larger than the specific distance L. The processor 11 controls the decoloring apparatus 3 based on the information input from the display 5.

Figure 4:
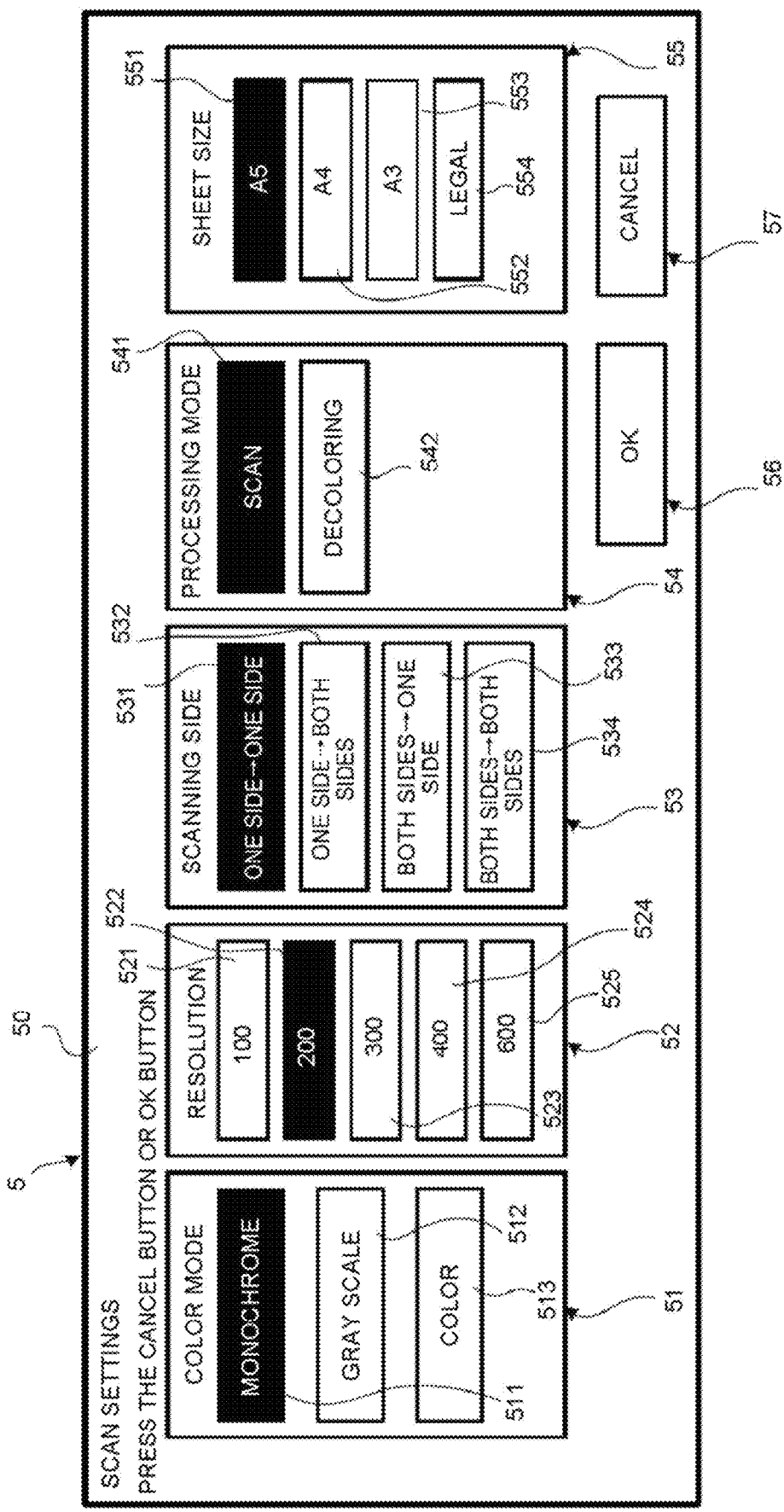
FIG. 4 is a diagram illustrating a first example of a selection screen displayed on a display of the MFP shown in FIG. 1.

In the first selection example shown in FIG. 4, the sheet size is A5. In this case, the length of the conveyed sheet S is shorter than the specific distance L, thus, the quality of the image will not be lowered even if the image scanning by the scanner 9 and the decoloring processing by the decoloring unit 37 are carried out simultaneously. Thus, though the resolution is set to 200 dpi as an initial setting, even if the resolution is set to 600 dpi which is much higher than the resolution of the initial setting, the quality of the image will not be lowered.

Figure 5:
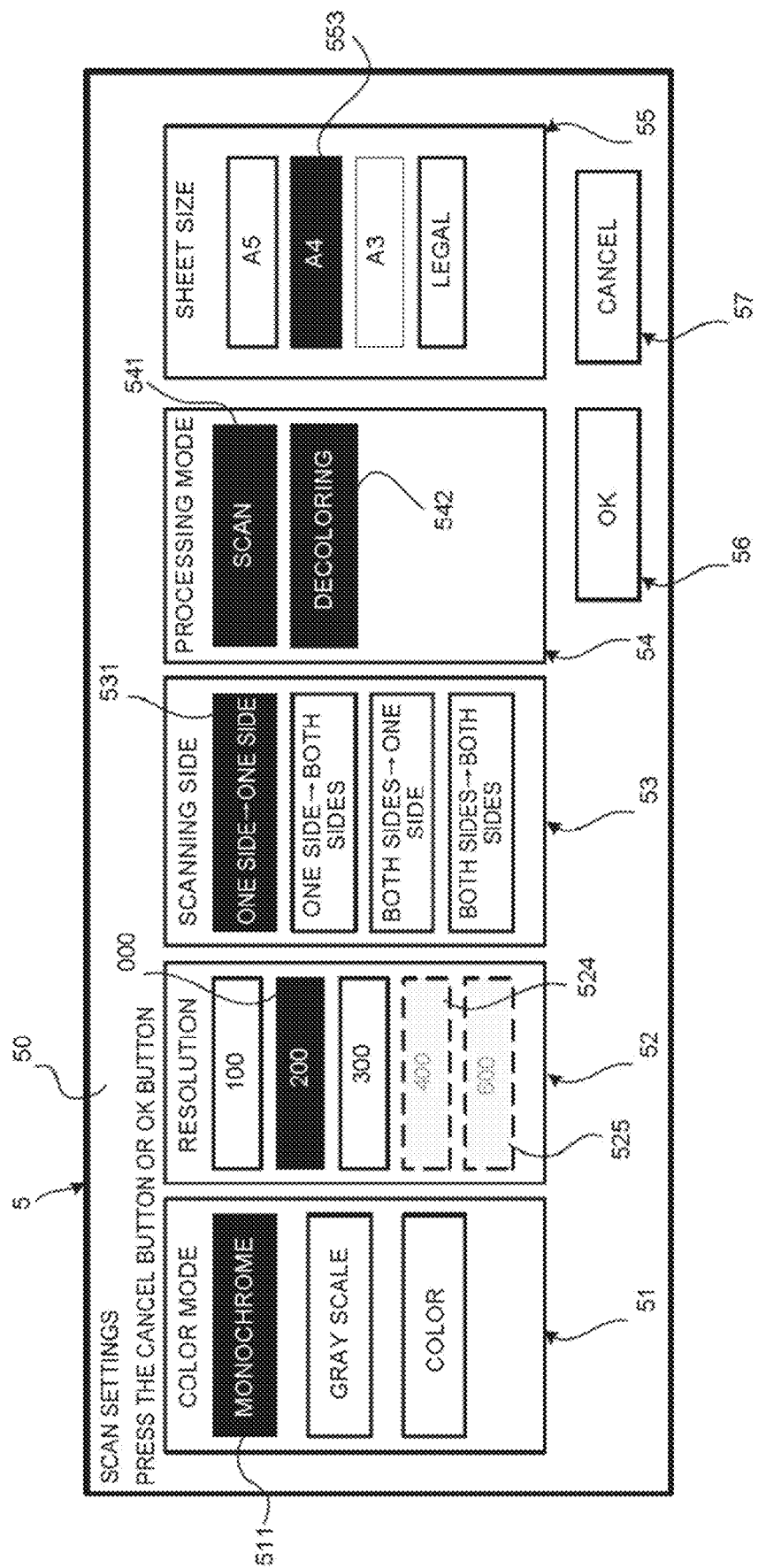
FIG. 5 is a diagram illustrating a second example of a selection screen displayed on the display.

In the second selection example shown in FIG. 5, the monochrome setting button 511 is pressed and the monochrome mode is selected in the color mode setting area 51. A resolution of 200 dpi is set as a default value in the resolution setting unit 52. If the resolution is higher than, for example, 400 dpi, the change of the sheet conveyance speed caused when the sheet passes through the decoloring unit 37 will affect the quality of the image to be scanned by the scanner 9 because the selected sheet size is A4 and the length of the conveyed sheet is longer than the specific distance L. However, in the second selection example shown in FIG. 5, the resolution is set to 200 dpi. Thus, the quality of the scanned image will not be lowered even if the scanning processing by the scanner 9 and the decoloring processing by the decoloring unit 37 are selected in the processing mode setting unit 54 to be performed simultaneously.

Before the scanning at the resolution setting set in the resolution setting unit 52 is carried out, the scanning processing setting button 541 and the decoloring processing setting button 542 in the processing mode setting unit 54 are pressed to select simultaneous processing of the image scanning processing by the scanner 9 and the image decoloring processing by the decoloring unit 37. In this case, as stated above embodiment, if the decoloring processing is executed by the decoloring unit 37 when the scanning than resolution is set equal to or higher than 400 dpi, the quality of the scanned image is affected due to the change of the conveyance speed. Thus, the 400 dpi setting button 524 and the 600 dpi setting button 525 in the resolution setting unit 52 cannot be selected. Accordingly, in FIG. 5, the display of the display 5 is grayed out to disable the selection of the 400 dpi setting button 524 and the 600 dpi setting button 525 in the resolution setting unit 52.

Figure 6:
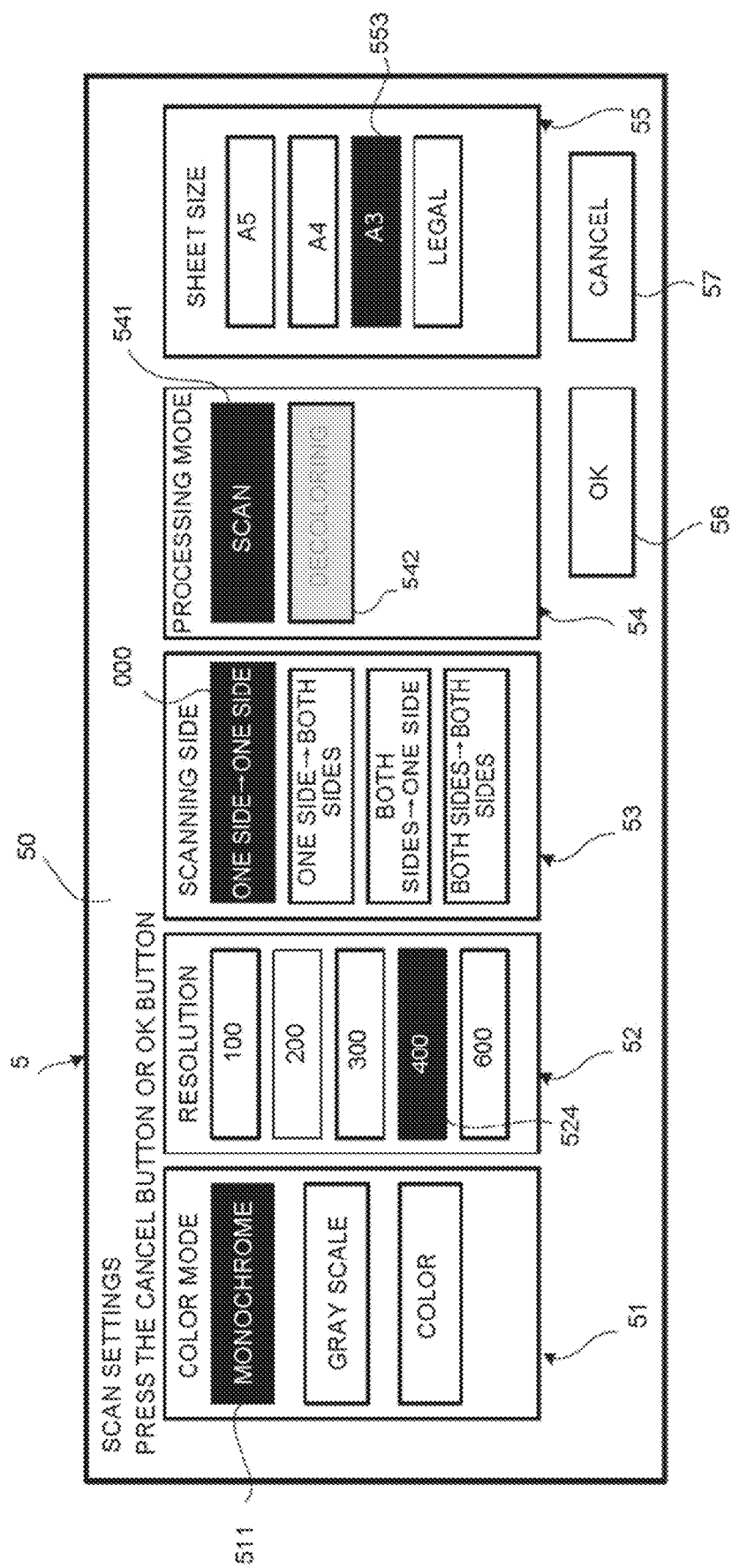
FIG. 6 is a diagram illustrating a third example of a selection screen displayed on the display.

In the third selection example shown in FIG. 6, first, the 400 dpi setting button 524 (indicating a resolution higher than the initial value 200 dpi) is pressed and the resolution 400 dpi is selected in the resolution setting unit 52. In this case, in the processing mode setting unit 54, the image scanning based on the selection of the scanning processing setting button 541 can be selected. However, as stated above, if the decoloring processing is executed by the decoloring unit 37 in a state in which a resolution higher than resolution 400 dpi is set, the quality of the scanned image is affected due to the change of the conveyance speed. Thus, the display of the decoloring processing setting button 542 is grayed out to disable the setting (selection) of the image decoloring processing.

Figure 7:
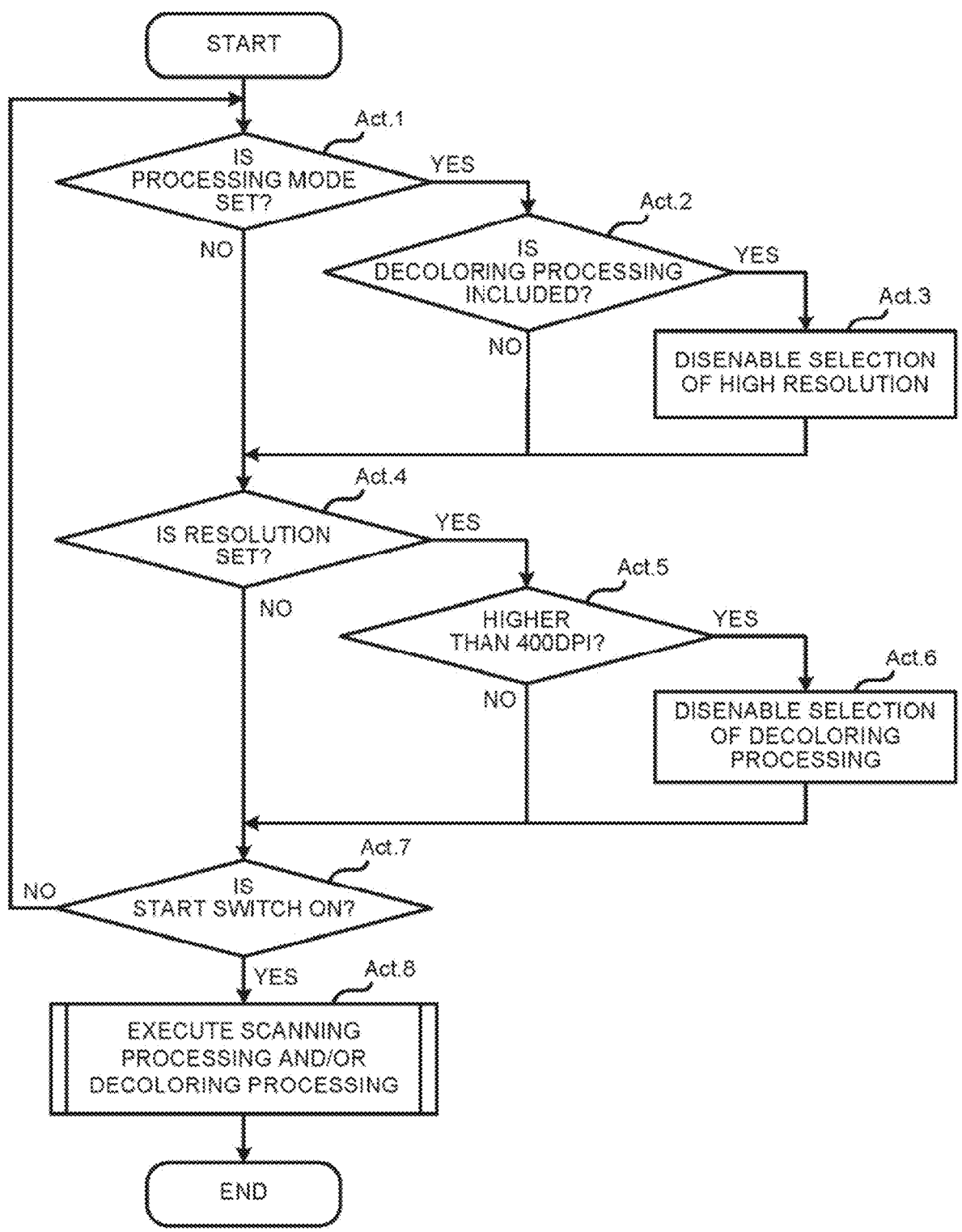
FIG. 7 is a flowchart illustrating an example sequence of operations relating to decoloring processing in the MFP.

The first processing carried out by the controller 10 is described with reference to FIGS. 4-6 and the flowchart shown in FIG. 7. In addition, it is assumed that the length of the sheet S stacked on the sheet feeder 31 is larger than the specific distance L. Further, it is assumed that the image printed on the sheet S stacked on the sheet feeder 31 is formed with the decolorable color material.

In ACT 1, it is determined whether the processing mode is set in the processing mode setting unit 54. If the processing mode is set (YES in ACT 1), processing proceeds to ACT 2. If the processing mode is not set (NO in ACT 1), processing proceeds to ACT 4.

In ACT 2, it is determined whether the decoloring processing is included in the set processing mode. If the decoloring processing setting button 542 is selected (YES in ACT 2), processing proceeds to ACT 3. If the decoloring processing setting button 542 is not selected (NO in ACT 2), processing proceeds to ACT 4.

In ACT 3, selection of a high resolution in the resolution setting unit 52 is disabled. As shown in FIG. 5, for example, the display of the 400 dpi setting button 524 and the 600 dpi setting button 525 is grayed out.

That is, as shown in FIG. 5, in a case in which the processing mode is selected first, if the decoloring processing setting button 542 is selected, the resolution that can then be selected is limited.

In ACT 4, it is determined whether the resolution is selected in the resolution setting area 52. If the resolution setting unit 52 is set (YES in ACT 4), processing proceeds to ACT 5. On the other hand, if the resolution is not selected in the resolution setting unit (NO in ACT 4), processing proceeds to ACT 7.

In ACT 5, it is determined whether the resolution set in the resolution setting unit 52 is higher than 400 dpi. If a resolution higher than 400 dpi is selected (YES in ACT 5), processing proceeds to ACT 6. If a resolution lower than 400 dpi is selected (NO in ACT 5), processing proceeds to ACT 7.

In ACT 6, selection of the decoloring processing setting button 542 in the processing mode setting unit 54 is disabled. As shown in FIG. 6, the display of the decoloring processing setting button 542 is grayed out.

That is, as shown in FIG. 6, in a case in which the resolution is set in the resolution setting unit 52 before the processing mode is set in the processing mode setting unit 54, and if the 400 dpi setting button 524 is selected, the selection of the decoloring processing is limited.

In ACT 7, it is determined whether the start switch on the operating unit 4 is ON. If the start switch is ON (YES in ACT 7), processing proceeds to ACT 8. If the start switch is not ON (NO in ACT 7), processing returns to ACT 1.

In ACT 8, the image scanning processing by the scanner 9 or the decoloring processing by the decoloring unit 37 is executed on the image printed on the sheet S, and then the present processing is ended.

Figure 8:
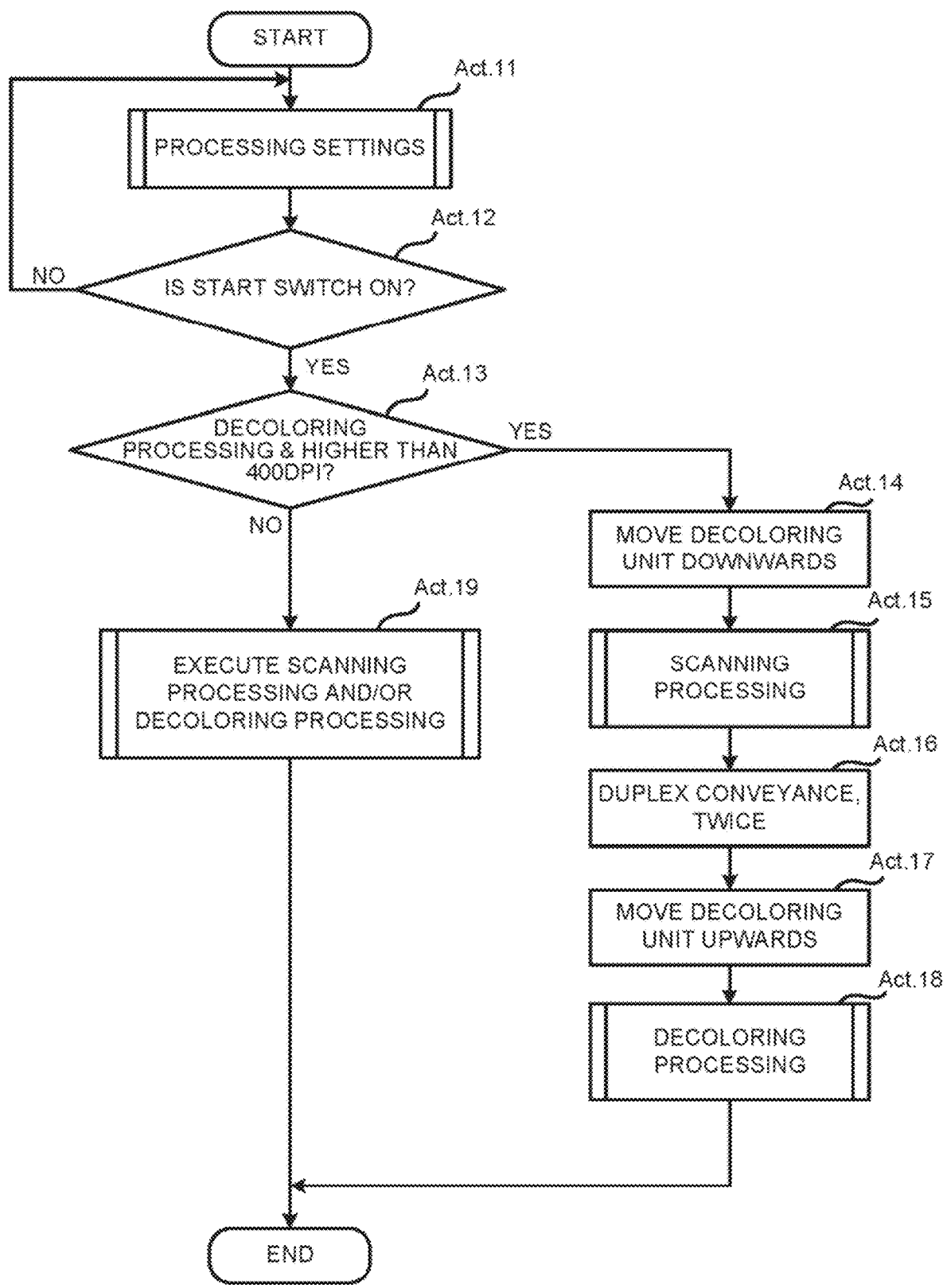
FIG. 8 is a flowchart illustrating another example sequence of operations relating to decoloring processing in the MFP.

The second processing carried out by the controller 10 is described with reference to FIG. 5 and the flowchart shown in FIG. 8. In addition, it is assumed that the size of the sheet S stacked on the sheet feeder 31 is larger than the specific distance L. Further, it is assumed that the image printed on the sheet S stacked on the sheet feeder 31 is formed with the decolorable color material. It is further assumed that the scanning side setting unit 53 is set to a mode for outputting a single-sided image from an input of a single-sided image.

In ACT 11, the settings of the setting units 51-55 are carried out, and then ACT 12 is taken.

In ACT 12, it is determined whether the start switch arranged on the operating unit 4 is ON. If the start switch is ON (YES in ACT 12), processing proceeds to ACT 13. If the start switch is not ON (NO in ACT 12), processing returns to ACT 11.

In ACT 13, it is determined whether the decoloring processing setting button 542 is selected in the processing mode setting unit 54 and a resolution higher than 400 dpi is set in the resolution setting unit 52. If it is determined that the decoloring processing and a resolution higher than 400 dpi are set (YES in ACT 13), processing proceeds to ACT 14. If it not determined that the decoloring processing and a resolution higher than 400 dpi are not set (NO in ACT 13), processing proceeds to ACT 19.

In ACT 14, the up and down driving unit 38 moves the decoloring unit 37 downwards, and then processing proceeds to ACT 15. A space is generated between the heating surface 371 and the pressing roller by moving the decoloring unit 37 downwards.

In ACT 15, the image printed on the first surface of the sheet S is scanned by the scanner 9, and then processing proceeds to ACT 16. As no change in the sheet conveyance speed is caused due to the decoloring unit 37 during the image scanning process, the sheet conveyance speed of the sheet S can be maintained with high precision. Thus, the scanner 9 can scan the image with high resolution and high precision.

In ACT 16, the switching flapper 34 is switched and the sheet is conveyed to the sheet duplex conveying path 35 to convey the sheet S to the lower conveying path 322 again, and then processing proceeds to ACT 17. After ACT 16 is completed, the sheet S is conveyed to the decoloring unit 37, with the first surface thereof facing the heating surface 371 of the decoloring unit 37.

In ACT 17, the up and down driving unit 38 moves the decoloring unit 37 upwards. Then, processing proceeds to ACT 18. By moving the decoloring unit 37 upwards, the heating surface 371 is brought into press contact with the pressing roller, and in this way, the decoloring processing can be carried out.

In ACT 18, the image printed on the first surface of the sheet S is decolored by the decoloring unit 37. At this time, the image scanning is not carried out by the scanner 9. Then the present processing is ended.

In ACT 19, the processing set in ACT 1 is executed, and then the present processing is ended. For example, the scanning processing by the scanner 9 and/or the decoloring processing by the decoloring unit 37 are/is executed. In this case, because the resolution of the scanner 9 is low, therefore, the quality of the image scanned by the scanner is good even if the processing mode is the decoloring processing.

In addition, in ACT 16, the sheet S may also be conveyed reversely on the lower conveying path 322 to be passed through the decoloring unit 37, instead of being subjected to duplex conveyance through the duplex conveying path 35. Then, the sheet S may be passed through the decoloring unit again.

Further, in the present embodiment, the decoloring apparatus 3 is also used as the ADF, however, the present invention is not limited to this. For example, it may also be arranged in a finisher.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A method for controlling a decoloring apparatus which includes a decoloring unit positioned downstream of a scanner in a sheet conveying direction, a distance along the sheet conveying direction between the scanner and the decoloring unit being shorter than a length of a first predetermined sheet size and longer than a length of a second predetermined sheet size, the method comprising:
   determining a size of the sheet to be conveyed;
   accepting an input selecting a scanning mode;
   controlling an available mode of the decoloring apparatus based on the determined sheet size and the selected scanning mode;
   accepting an input selecting the available mode of the decoloring apparatus;
   determining whether to perform decoloring based on the selected mode of the decoloring apparatus;
   conveying the sheet through the scanner and the decoloring unit;
   controlling the scanner based on the selected scanning mode; and
   controlling the decoloring unit in accordance with the determination of whether to perform decoloring.

2. The method according to claim 1, wherein
if a resolution of the selected scanning mode for scanning the image of the sheet is higher than a predetermined resolution, the decoloring unit is controlled to not perform decoloring.

3. The method according to claim 1, wherein
if a resolution of the selected scanning mode for scanning the image of the sheet is lower than a predetermined resolution, the decoloring unit is controlled to perform decoloring.

4. The method according to claim 1, further comprising:
   receiving, via a resolution setting section of a user interface, an input for setting a resolution of the image to be scanned by the scanner;
   receiving a selection to execute scanning processing by the scanner in a first section of a processing setting section or a selection to execute decoloring processing by the decoloring unit in a second section of the processing setting section; and
   disabling selection of the decoloring processing in the second section of the processing setting section if the resolution input in the resolution setting section is higher than a predetermined resolution.

5. The method according to claim 4, wherein
the user interface further includes a sheet size setting section for selecting the size of the sheet to be conveyed, and
the determination of the size of the sheet to be conveyed is based on the size of the sheet selected in the sheet size setting section.

* * * * *